(12) United States Patent
Nagashima (10) Patent No.: US 8,252,379 B2
(45) Date of Patent: Aug. 28, 2012

(54) FALSE INLAY DECORATION AND METHOD FOR PRODUCING THE SAME

(75) Inventor: Yoichi Nagashima, Kasukabe (JP)

(73) Assignee: Nagashimakougei Co., Ltd., Saitama (JP)

( * ) Notice: Subject to any disclaimer, the term of this patent is extended or adjusted under 35 U.S.C. 154(b) by 1100 days.

(21) Appl. No.: 11/919,385

(22) PCT Filed: Mar. 20, 2006

(86) PCT No.: PCT/JP2006/305582
§ 371 (c)(1),
(2), (4) Date: Oct. 26, 2007

(87) PCT Pub. No.: WO2006/117941
PCT Pub. Date: Nov. 9, 2006

(65) Prior Publication Data
US 2009/0305003 A1    Dec. 10, 2009

(30) Foreign Application Priority Data
Apr. 26, 2005    (JP) .................................. 2005-127622

(51) Int. Cl.
*B05D 1/36* (2006.01)
*B44C 1/22* (2006.01)

(52) U.S. Cl. ........ 427/264; 427/259; 427/261; 427/270; 216/28; 216/29; 216/32; 216/39

(58) Field of Classification Search .......................... None
See application file for complete search history.

(56) References Cited

U.S. PATENT DOCUMENTS

| 2,262,281 | A | * | 11/1941 | Hagler et al. | .................. 427/270 |
| 3,537,874 | A | * | 11/1970 | Ramey | ........................ 427/270 |
| 2005/0006019 | A1 | * | 1/2005 | Ratcliffe | ........................ 156/64 |

FOREIGN PATENT DOCUMENTS

| DE | 3432681 | | 3/1986 |
| JP | 53-11843 | | 2/1978 |
| JP | 59-143698 | | 8/1984 |
| JP | 59143698 | A * | 8/1984 |
| JP | 6-36902 | B2 * | 5/1994 |
| JP | 11-321663 | | 11/1999 |
| JP | 2002-172897 | | 6/2002 |
| JP | 2004-82643 | | 3/2004 |
| WO | 02/40805 | | 5/2002 |

OTHER PUBLICATIONS

German Office Action issued Apr. 16, 2009 for the corresponding German application.
Korean Search Report issued Mar. 6, 2009 in the corresponding Korean Application.
International Search Report issued Jun. 20, 2006 in the International (PCT) Application of which the present application is the U.S. National Stage.

* cited by examiner

*Primary Examiner* — David Turocy
*Assistant Examiner* — Joel Horning
(74) *Attorney, Agent, or Firm* — Wenderoth, Lind & Ponack, L.L.P.

(57) ABSTRACT

A false inlay decoration is characterized in that a linear notch is formed in a surface of a base by laser processing; a first decoration face and a second decoration face are sectioned and formed by the linear notch; and a coating layer is formed on the inner surface of the linear notch.

3 Claims, 9 Drawing Sheets

FALSE INLAY DECORATION AND METHOD FOR PRODUCING THE SAME

TECHNICAL FIELD

The present invention relates to a false inlay decoration that gives an upscale image which is the same as or similar to that given by inlaid wood products and the like, and a method for producing the same.

BACKGROUND ART

It is known that inlaid wood products with a beautiful woodgrain pattern are used for an interior panel of an ultra-luxury passenger car. There is a desire to use such wood products for a part of a mass-produced passenger car and thereby boost demand for the car. However, natural wood involves the problems of not being uniform in quality and of being hard to get in large quantity. Known is the technique of hydraulically transferring a woodgrain pattern to a mass-produced base made of plastic or the like for the purpose of solving the above problems. (See Patent Document 1.)

[Patent Document 1] Japanese Patent Application Laid-Open Publication No. Hei 11-321663

Even if characters, patterns or the like are printed, so as to look like inlays, within areas bordered by printed boundary lines on an object having a woodgrain pattern formed thereon as disclosed in the above Patent Document 1, there is a problem that such printed characters or patterns merely look like printed ones and lack upscale-looking texture as is given by the inlays.

SUMMARY OF THE INVENTION

An object of the present invention is to solve the foregoing problem. Since humans have the sense of sight capable of discriminating between a boundary line actually formed by inlays and merely a printed line, the present invention aims to provide a false inlay decoration and a method for producing the same, by utilizing this discrimination ability.

[Means for Solving Problems]

To achieve the above object, a false inlay decoration of the present invention is characterized in that a linear notch is formed in a surface of a base by laser processing; a first decoration face and a second decoration face are sectioned and formed by the linear notch serving as a boundary; and a coating layer is formed on the inner surface of the linier notch. The first decoration face and the second decoration face are each formed of either one of a hydraulic transfer film and a metal coating film. The metal coating film is formed by any one of plating, sputtering, metal deposition, silver mirror reaction coating, and ion plasma evaporation. The linear notch has a width of, for example, 70 to 150 microns.

A method for producing a false inlay decoration according to a first embodiment of the present invention is characterized by including the steps of: forming a first decoration face on a surface of a base; masking the entire top surface of the first decoration face with a masking material; forming a linear notch along a desired boundary by laser processing, the linear notch reaching from the masking material into the base; forming a coating layer on the inner surface of the linear notch; removing the masking material and the first decoration face in either one of areas sectioned by the linear notch; forming a second decoration face on the surface of the base in the area in which the masking material and the first decoration face have been removed; and removing the remaining masking material so that the first decoration face emerges.

A method for producing a false inlay decoration according to a second embodiment of the present invention is characterized by including the steps of: forming a first decoration face on a surface of a base; masking the entire top surface of the first decoration face with a masking material; forming a linear notch along a desired boundary by laser processing, the linear notch reaching from the masking material into the base; forming a coating layer on the inner surface of the linear notch; removing the masking material in either one of areas sectioned by the linear notch; forming a second decoration face on the first decoration face in the area in which the masking material has been removed; and removing the remaining masking material so that the first decoration face emerges.

A method for producing a false inlay decoration according to a third embodiment of the present invention is characterized by including the steps of: masking a surface of a base with a first masking material; forming a linear notch in the first masking material along a desired boundary by laser processing, the linear notch reaching from the first masking material into the base; removing the first masking material in either one of areas sectioned by the linear notch; forming a first decoration face on the surface of the base having the first masking material removed therefrom and the remaining first masking material; removing the first masking material as well as the first decoration face on the first masking material; masking the remaining first decoration face and the surface of the base with a second masking material; forming again a linear notch in the second masking material and the first decoration face along the position of the linear notch by laser processing, the linear notch reaching into the base; forming a coating layer in the linear notch; removing the rest of the second masking material while leaving the first decoration face and the second masking material on the first decoration face, so that the surface of the base emerges; forming a second decoration face on the first decoration face, the linear notch and the emerging surface of the base; and removing the second masking material and the second decoration face on the second masking material, thereby forming the first decoration face and the second decoration face flush with each other.

In the producing method according to any one of the first, second and third embodiments of the present invention, the first decoration face and the second decoration face are each formed of either one of a hydraulic transfer film and a metal coating film.

Further, the metal coating film is formed by any one of plating, sputtering, metal deposition, silver mirror reaction coating, and ion plasma evaporation.

[Advantageous effect of the Invention]

According to the false inlay decoration described above, the boundary, which is formed of the fine linear notch formed by the laser processing and the coating layer formed on the inner surface of the linear notch, is present between the first decoration face and the second decoration face. Thereby, a boundary line as is formed by a real inlay develops and looks as if it were inlaid. On the boundary line, the linear notch formed by the laser processing emerges on the border between the first and second decoration faces, and thereby either one of the decoration faces looks as if it were inlaid. In other words, the false inlay decoration can achieve an effect as given below: the decoration faces look as if one decoration face, a background section, had the other decoration face, for example a character or graphic section, inlaid therein.

According to the false inlay decoration described above, moreover, the decoration face is formed of the hydraulic transfer film. This enables forming a woodgrain pattern on the base surface having a complicated geometry and also enables forming the metal coating film such as metal plating that gives an upscale image, and hence enables a combination of these for providing design flexibility. According to the false inlay decoration, moreover, a processing method for the metal coating film can be selected according to coating quality and ease of post-processing. According to the false inlay decoration, further, the width of the three-dimensional linear notch is narrow, and thus the linear notch looks just like the border between two decoration faces, as is formed by the real inlay. Therefore, the false inlay decoration can achieve an effect as given below: there is a great difference between the false inlay decoration and an object such as the arrangement of printed matter.

Moreover, the method for producing a false inlay decoration according to any one of the first, second and third embodiments of the present invention can provide the false inlay decoration of uniform quality, which is adaptable to mass production. The quality of the false inlay decoration is so high that the false inlay decoration cannot be discriminated from the real inlay. As for the number of man-hours for production of the false inlay decoration, the time required for production thereof is very short, as compared to time and effort required for the real inlay.

The producing method according to the first embodiment enables forming the decoration faces flush with each other, although having to remove the unnecessary decoration face formed on the base, besides the masking material. In the producing method according to the second embodiment, moreover, there is a difference in level between the final decoration faces, which gives a more three-dimensional effect. Further, the producing method according to the third embodiment is suitable for formation of a plating face, because of being able to dip the overall masked base in a bath and thereby form a necessary face into the decoration face.

Further, the method for producing a false inlay decoration according to any one of the above embodiments of the present invention can increase design flexibility because of enabling using the hydraulic transfer film and the metal coating film or various combinations of these.

Figure 11:
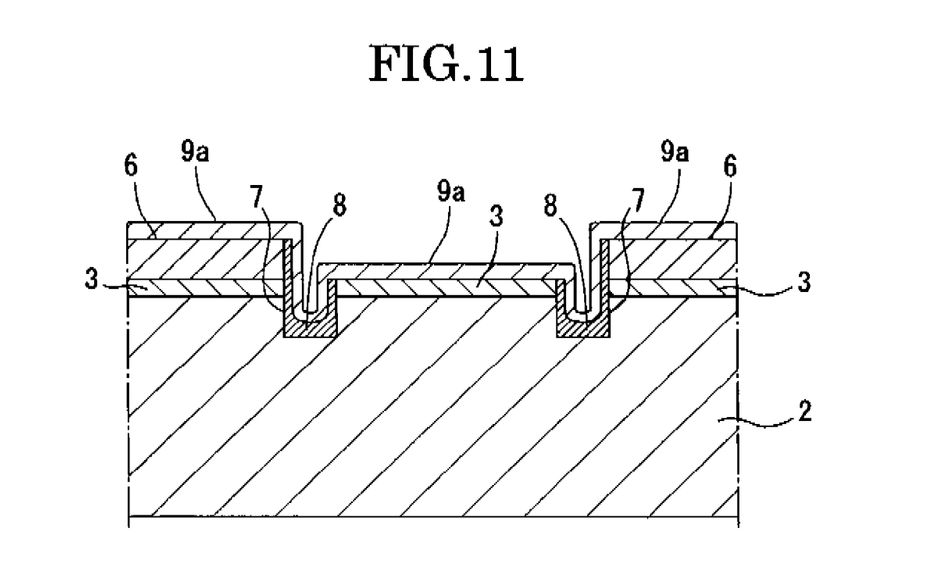
FIG. 11 is an enlarged partial end view showing a manufacturing process 5 according to a second embodiment of the present invention.
Figure 12:
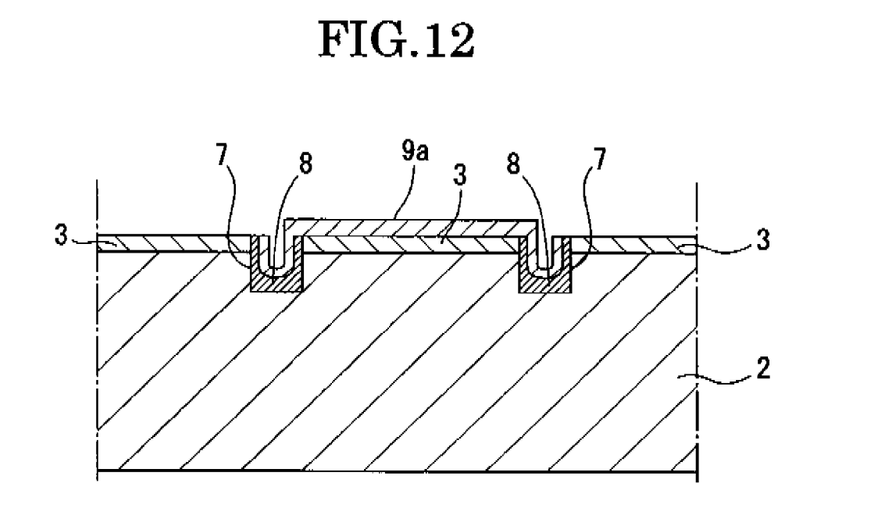
FIG. 12 is an enlarged partial end view showing a manufacturing process 6 according to the second embodiment of the present invention.
Figure 13:
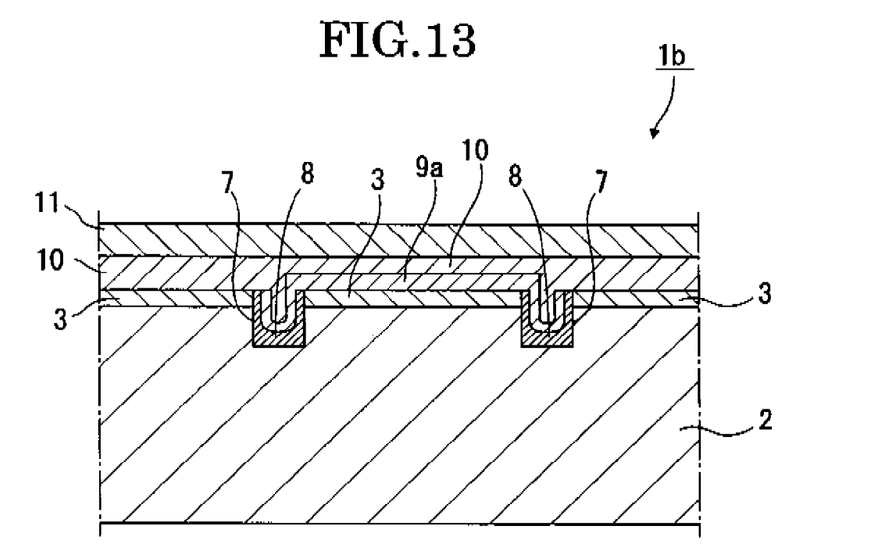
FIG. 13 is an enlarged partial end view showing a manufacturing process 7 according to the second embodiment of the present invention.

EXPLANATION OF REFERENCE NUMERALS 1a, 1b and 1c . . . interior panels, 2 . . . base, 3 . . . first decoration face, 4 . . . transfer bath, 5 . . . transfer film, 6a, 6b and 6c . . . masking materials, 7 . . . linear notch, 8 . . . coating layer, 9a . . . second decoration face, 10 . . . color coat, 11 . . . top coat Detailed Description Of THE INVENTION Preferred embodiments of the present invention as applied to an automotive interior panel or the like will now be described in detail with reference to the accompanying drawings, FIGS. 1 to 22. In the accompanying drawings as employed herein, FIG. 1, a plan view of an interior panel according to a first embodiment; FIG. 2, a schematic illustration for explaining a hydraulic transfer process, showing an example of a method for decorating a false inlay decoration; FIGS. 3 to 6, enlarged partial end views showing manufacturing processes 1 to 4, respectively, according to the first and second embodiments; FIGS. 7 to 10, enlarged partial end views showing manufacturing processes 5 to 8, respectively, according to the first embodiment; FIGS. 11 to 13, enlarged partial end views showing manufacturing processes 5 to 7, respectively, according to the second embodiment; and FIGS. 14 to 22, enlarged partial end views showing manufacturing processes 1 to 5, respectively, according to a third embodiment.

Figure 1:
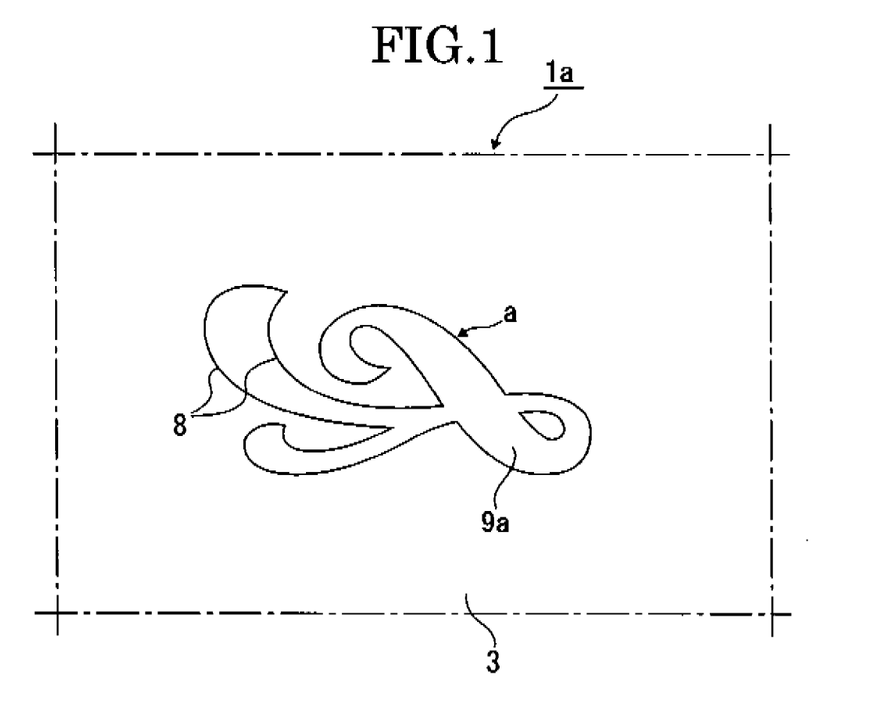
FIG. 1 is a partial plan view of an interior panel showing an example of the present invention.
Figure 2:
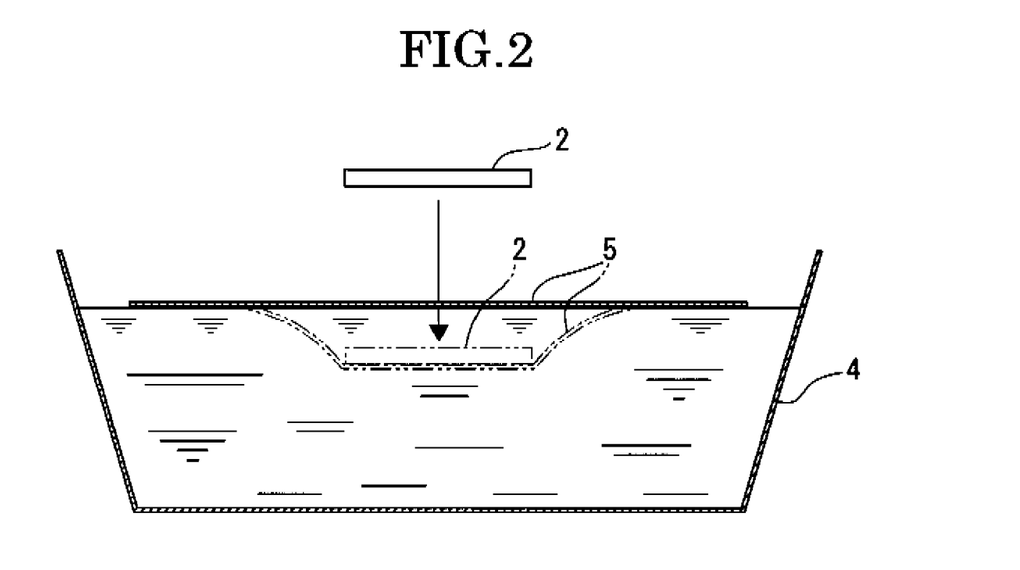
FIG. 2 is a schematic illustration of assistance in explaining a hydraulic transfer process, showing an example of a method for decorating a false inlay decoration.

An interior panel 1a shown in FIG. 1 as an example of the false inlay decoration is, for example, what is mounted in the interior of a car, such as an instrument panel or a door panel that is an automotive interior part. The interior panel 1a includes a first decoration face 3, a second decoration face 9a, and a boundary, indicated by the reference character "a," which sections the first decoration face 3 and the second decoration face 9a. The decoration faces 3 and 9a are formed of patterns including characters, geometrical structures and marks, colors, a combination of these, or the like.

Figure 10:
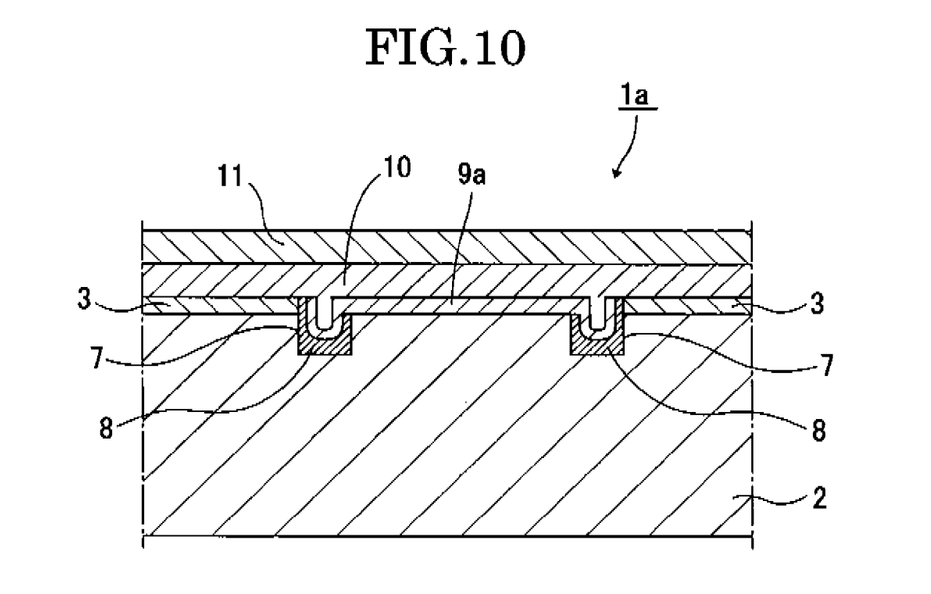
FIG. 10 is an enlarged partial end view showing a manufacturing process 5 according to the first embodiment of the present invention.
Figure 22:
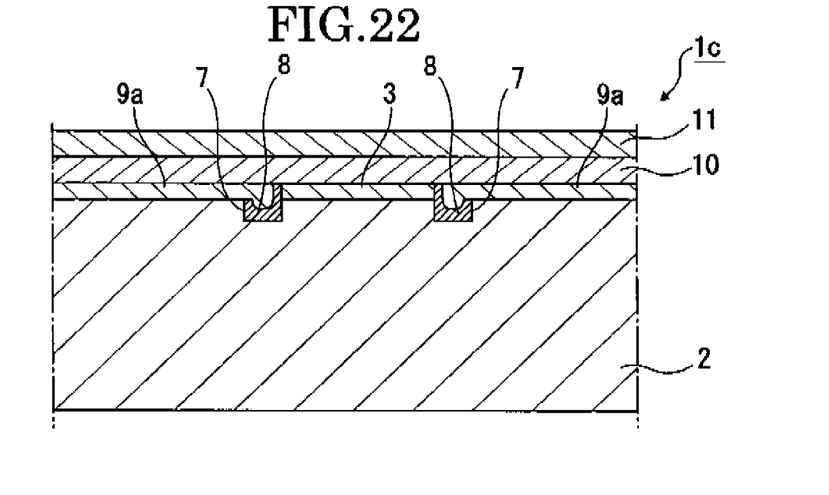
FIG. 22 is an enlarged partial end view showing a manufacturing process 5 according to the third embodiment of the present invention.

The false inlay decoration can be of any one of cross sections as shown in FIGS. 10, 13 and 22, which are that of the interior panel 1a according to the first embodiment, that of an interior panel 1b according to the second embodiment, and that of an interior panel 1c according to the third embodiment, respectively. The false inlay decoration includes a base 2; an extra-fine linear notch 7 formed in the surface of the base 2 by laser processing, the linear notch 7 acting as the boundary a to section the first decoration face 3 and the second decoration face 9a; a coating layer 8 formed on the inner surface of the linear notch 7; a color coat 10 formed on top of the first decoration face 3 and so on; and a top coat 11 formed on top of the color coat 10. The false inlay decoration is not limited to being applied to a flat plate such as the panel but may be applied to a three-dimensional object.

Although the base 2 can be made of wood, the base 2 is generally made of a synthetic resin such as an acrylic resin, a polycarbonate resin, or an ABS (acrylonitrile butadiene styrene) resin, rather than natural wood, taking into account uniformity, deformability, mass-productivity, and so on. The first decoration face 3 and the second decoration face 9a, which are bordered by the linear notch 7 formed as the boundary a in the surface of the base 2 by the laser processing, are each formed of either one of a hydraulic transfer film and a metal coating film. The hydraulic transfer film is surfaced with a woodgrain pattern, in a carbon face style or without a pattern or is otherwise surfaced, and the metal coating film is surfaced with a metallic luster or is matte-surfaced.

The hydraulic transfer film is formed by a known processing method. Specifically, as shown in FIG. 2, the formation of the hydraulic transfer film involves floating a transfer film 5 in a transfer bath 4 filled with water; sinking the base 2 into the water while pressing the base 2 against the transfer film 5 from above the transfer film 5, the base 2 being masked in an area not requiring transfer; and transferring the hydraulic transfer film to the base 2 under water pressure. The transfer using this method is adaptable to even the complicated three-dimensional geometry of the base 2. What is suitable for mass production and adaptable to a complicated geometry, rather than an inlay material made of wood, is used also for the transfer film 5.

The metal coating film is formed by plating, sputtering, metal deposition, silver mirror reaction coating, ion plasma evaporation, or the like.

The linear notch 7 is formed to look like the boundary of the abutment position of the inlay and is as thin as or thinner than a hair. Thus, the laser processing is appropriate in terms of processing fineness, processing speed, processing reproducibility, and so on. When a carbon dioxide laser, for example, is selected for use from among various lasers, the power of the laser is adjusted so that the linear notch 7 is formed as being as extra-thin as 70 to 150 microns, which is recognizable as the inlay. The coating layer 8 is formed on the inner surface of the linear notch 7 by filling into the linear notch 7 colored or colorless ink or a coating having a different color tone from the color tones of the first decoration face 3 and the second decoration face 9a.

Firstly, the first embodiment of the present invention will be described with reference to the accompanying drawings, FIGS. 1 to 10. The interior panel 1a includes the base 2 made of, for example, the synthetic resin, which is formed in a predetermined surface geometry; the first decoration face 3 formed on the base 2 by the known hydraulic transfer process, the first decoration face 3 acting as the hydraulic transfer film with, for example, the woodgrain pattern to form a background; and the second decoration face 9a formed on the base 2 by the known hydraulic transfer process, the second decoration face 9a acting as the hydraulic transfer film in a character or graphic form, having a lighter color tone than that of the first decoration face 3. The linear notch 7 is formed in the surface of the base 2 on the boundary a between the first decoration face 3 and the second decoration face 9a by the processing using a relatively-low-power carbon dioxide laser.

The linear notch 7 has a thickness of 70 to 150 microns, and the coating layer 8, such as ink, a coating or a filler having a darker color tone than the color tones of the first decoration face 3 and the second decoration face 9a, is formed on the inner surface of the linear notch 7. The coating layer 8 having the darker color tone as mentioned above ensures that the linear notch 7 is three-dimensionally recognized, because the darker coating layer 8 makes a pinhole unnoticeable in the event of appearance of the pinhole during manufacture and the boundary a also has the darker color tone.

However, the coating layer 8 may have other color tones. For example, the coating layer 8 may have the same color as that of the first decoration face 3 and the second decoration face 9a or may have a white color or the like. Also when the coating layer 8 has the same color, the linear notch 7 is three-dimensionally recognized. When the coating layer 8 has a light color tone such as the white color, the boundary a becomes noticeable and hence the linear notch 7 is more three-dimensionally recognized, as compared to an instance where the coating layer 8 has the same color. The coating layer 8 has varying thicknesses according to the material therefor or the like, and the coating layer 8 is filled into the linear notch 7 or is formed on the inner surface of the linear notch 7. Finally, the color coat 10 and the top coat 11 are applied to thereby yield the formation of the false inlay decoration and thus the completion of the interior panel 1a.

As mentioned above, the coating layer 8 is filled into the linear notch 7 or is otherwise formed therein. This reduces the likelihood of air being trapped in the linear notch 7, and hence eliminates deterioration in coating quality or the like resulting from the evolution of air bubbles even on the occasion of application of the color coat 10 and the top coat 11, which occurs later. Alternatively, the hydraulic transfer film has a thickness of 1 to 2 microns.

Detailed description will now be given with reference to FIGS. 3 to 6 and FIGS. 7 to 10 with regard to the manufacturing processes for manufacturing the interior panel 1a that is the false inlay decoration according to the first embodiment of the present invention.

(Manufacturing process 1)

Figure 3:
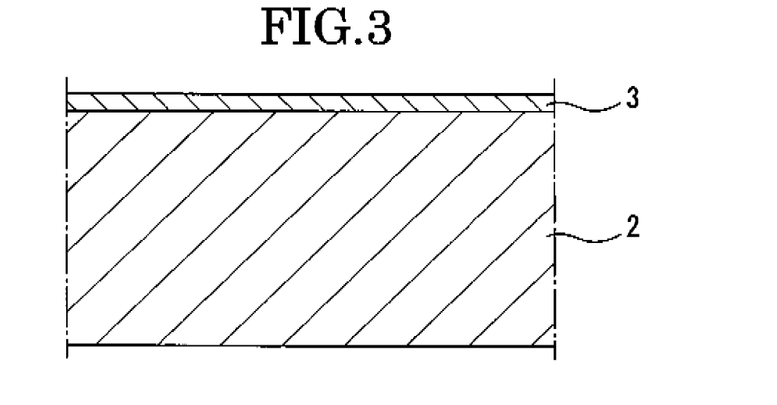
FIG. 3 is an enlarged partial end view showing a manufacturing process 1 according to a first embodiment of the present invention.

As shown in FIG. 3, the first decoration face (i.e., first decoration layer) 3 with a translucent woodgrain pattern is formed from the transfer film 5 with the woodgrain pattern onto the base 2 by performing a primary hydraulic transfer process on the base 2. The base 2 is formed in a predetermined geometry as the interior panel 1a, is made of the synthetic resin and is in a flat plate form as employed herein. This is a known technical approach as the hydraulic transfer process as shown in FIG. 2, which involves sinking the base 2 into the water with the transfer film 5 floating in the transfer bath 4 having the water held therein, thereby adhering the transfer film 5 to the base 2 by the action of water pressure, and thereby forming the first decoration face (first decoration layer) 3 throughout the entire surface of the base 2.
(Manufacturing process 2)

Figure 4:
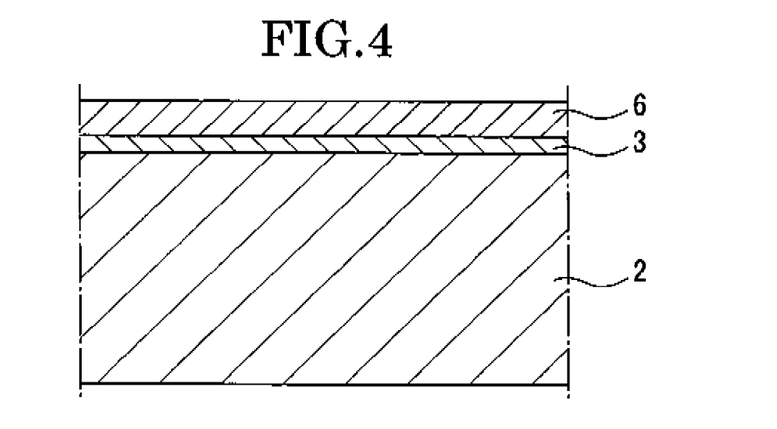
FIG. 4 is an enlarged partial end view showing a manufacturing process 2 according to the first embodiment of the present invention.

As shown in FIG. 4, the first decoration face (layer) 3 formed on the surface of the base 2 is masked throughout the entire top surface with a masking material 6.
(Manufacturing process 3)

Figure 5:
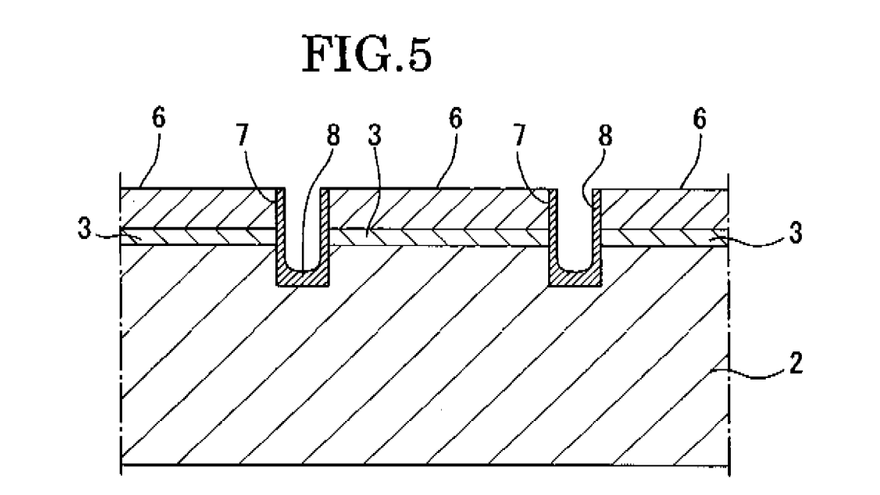
FIG. 5 is an enlarged partial end view showing a manufacturing process 3 according to the first embodiment of the present invention.

As shown in FIG. 5, the linear notch 7 having width of about 70 to 150 microns is formed as reaching from an upper surface of the masking material 6 into the base 2 (i.e., through the masking material 6 into the base 2), along the boundary a that forms the contour of a predetermined geometrical structure, by performing the laser processing while adjusting the power of the carbon dioxide laser. Then, ink having a darker color tone than that of the first decoration face 3 is forced into the linear notch 7 from above the masking material 6 while being leveled by a spatula, and thereby the coating layer 8 is formed on the inner surface of the linear notch 7. If a much larger amount of ink than that shown in FIG. 5 is forced into the linear notch 7 so that the coating layer 8 is filled into the linear notch 7 until reaching the vicinity of the surface of the first decoration face 3, there is still less room for air to enter, which reduces the likelihood of the pinhole or the like appearing.
(Manufacturing Process 4)

Figure 6:
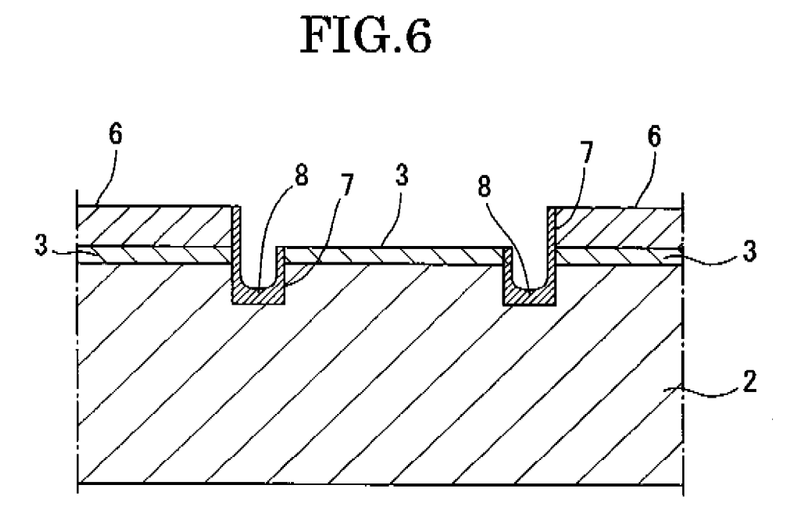
FIG. 6 is an enlarged partial end view showing a manufacturing process 4 according to the first embodiment of the present invention.

As shown in FIG. 6, either one of areas sectioned by the linear notch 7 is removed. Here, the masking material 6 within the boundary a shown in FIG. 1 as employed is removed.
(Manufacturing Process 5)

Figure 7:
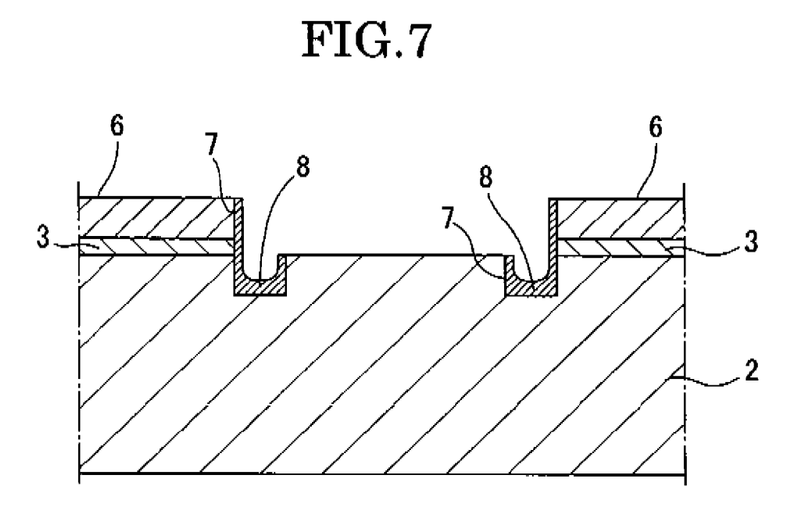
FIG. 7 is an enlarged partial end view showing a manufacturing process 5 according to the first embodiment of the present invention.

As shown in FIG. 7, the first decoration face 3 emerging through the removal of the masking material 6 is removed so that the surface of the base 2 emerges. To remove a first transfer film that is the first decoration face 3, for example, a solvent that does not affect the base 2 is used for wiping or cleaning, or bead blasting is done for removal.
(Manufacturing Process 6)

Figure 8:
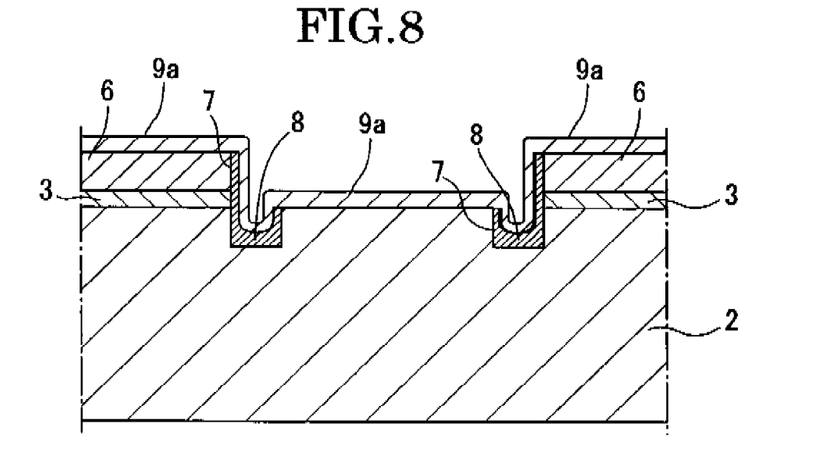
FIG. 8 is an enlarged partial end view showing a manufacturing process 5 according to the first embodiment of the present invention.

As shown in FIG. 8, the second decoration face 9a, which is a translucent second transfer film with the woodgrain pattern having a lighter color tone than that of the first transfer film that is the first decoration face 3, is formed on the surface of the base 2 emerging as just masked with the masking material 6, by a secondary hydraulic transfer process. The second decoration face 9a is formed not only on the surface of the base 2 but also on top of the coating layer 8 and the masking material 6.
(Manufacturing Process 7)

Figure 9:
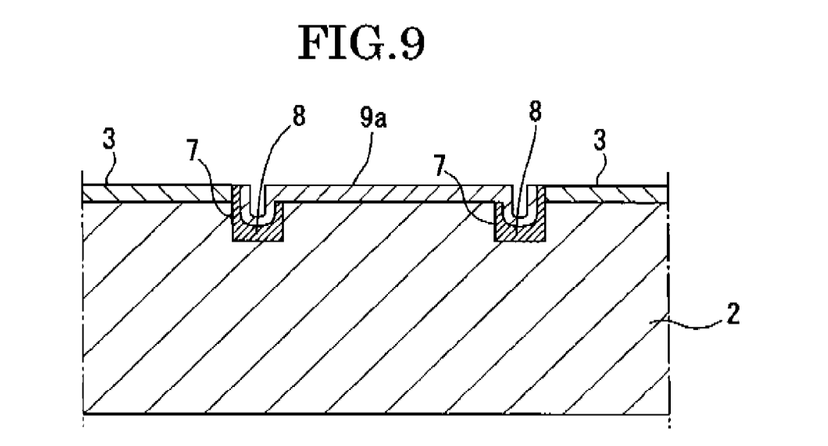
FIG. 9 is an enlarged partial end view showing a manufacturing process 5 according to the first embodiment of the present invention.

As shown in FIG. 9, the remaining masking material 6 is removed in conjunction with the second decoration face formed on top of the masking material 6 so that the first decoration face 3 emerges, and thereby the translucent second decoration face 9a with its edge covering the linear notch 7 is formed inwardly from the first decoration face 3.
(Manufacturing Process 8)

As shown in FIG. 10, the color coat 10 made of a see-through material for preventing discoloring and the top coat 11 made of a see-through material for protecting the surface are formed in sequence throughout the entire surface on and above the first decoration face 3 and the second decoration face 9a. Thereby, the linear notch 7 looks as if it were a real inlay in abutting relation between the first decoration face 3 and the second decoration face 9a, resulting in the completion of the interior panel 1a that is the false inlay decoration.

The second embodiment of the present invention will now be described with reference to the accompanying drawings, FIGS. 1 to 6 and FIGS. 11 to 13.

As shown in FIG. 13, the interior panel 1b is substantially the same as the interior panel 1a according to the first embodiment and is different from the interior panel 1a in that the second decoration face 9a is superposed on the first decoration face 3 within the area sectioned by the linear notch 7. Other structures are the same as those of the first embodiment, and description thereof is omitted.

Detailed description will now be given with regard to the manufacturing processes for manufacturing the interior panel 1b that is the false inlay decoration according to the second embodiment of the present invention. Since the manufacturing processes 1 to 4 are the same as the manufacturing processes for the interior panel 1a according to the first embodiment, detailed description thereof is omitted, and the manufacturing process 5 and the following processes will be described with reference to FIGS. 11 to 13.
(Manufacturing Processes 1 to 4)

The manufacturing processes 1 to 4 are the same as those of the first embodiment mentioned above. As shown in FIG. 6, the linear notch 7 having the coating layer 8 formed therein is formed in the surface of the base 2, the first decoration face 3 is formed within one of the areas sectioned by the linear notch 7, specifically, a range bordered with the linear notch 7 as employed herein, and the masking material 6 superposed on the first decoration face 3 is formed outside the range.
(Manufacturing Process 5)

As shown in FIG. 11, the second decoration face 9a is formed under a masked condition as shown in FIG. 6. Formed for the second decoration face 9a is the second transfer film with a woodgrain pattern or the like having a different color tone from that of, for example, the first transfer film formed for the first decoration face 3. In this case, a superposed area of the first decoration face 3 and the second decoration face 9a has a darker color tone than that of the first decoration face 3. Incidentally, when the first decoration face 3 has a woodgrain pattern of a light color and the second decoration face 9a superposed thereon has a woodgrain pattern of a dark color, the underlying pattern is hidden from view by the overlying pattern. Moreover, when the translucent transfer film is used for the second decoration face 9a, the linear notch 7 provided with the coating layer 8 can be visually recognized through the second decoration face 9a.
(Manufacturing Process 6)

As shown in FIG. 12, the masking material 6 that masks the first decoration face 3 as shown in FIG. 11 is removed so that the first decoration face 3 emerges outside the area sectioned by and bordered with the linear notch 7. The second decoration face 9a is formed above the first decoration face 3 within the area sectioned by and bordered with the linear notch 7.
(Manufacturing Process 7)

As shown in FIG. 13, the color coat 10 made of the see-through material for preventing discoloring and the top coat 11 made of the see-through material for protecting the surface are formed in sequence throughout the entire surface on and above the first decoration face 3 and the second decoration face 9a. Thereby, the linear notch 7 looks as if it were the real inlay in abutting relation between the first decoration face 3 and the second decoration face 9a, resulting in the completion of the interior panel 1b that is the false inlay decoration.

Further, the third embodiment of the present invention will be described with reference to the accompanying drawings, FIGS. 14 to 22.

As shown in FIG. 22, the interior panel 1c is substantially the same as the interior panel 1a according to the first embodiment and is different from the interior panel 1a in that the first decoration face 3 lies within the area sectioned by and bordered with the linear notch 7 and the second decoration face 9a lies outside the area. Other structures are the same as those of the first embodiment, and description thereof is omitted.

Detailed description will now be given with regard to the manufacturing processes for manufacturing the interior panel 1c that is the false inlay decoration according to the third embodiment of the present invention.

(Manufacturing Process 1)

Figure 14:
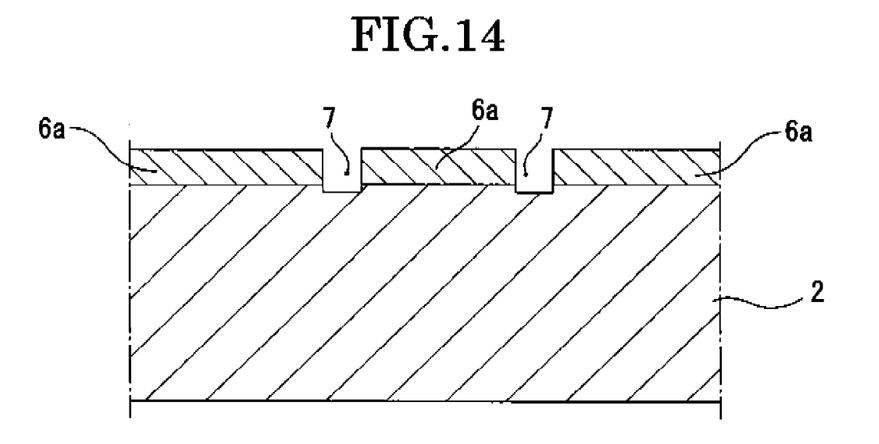
FIG. 14 is an enlarged partial end view showing a manufacturing process 1 according to a third embodiment of the present invention.
Figure 15:
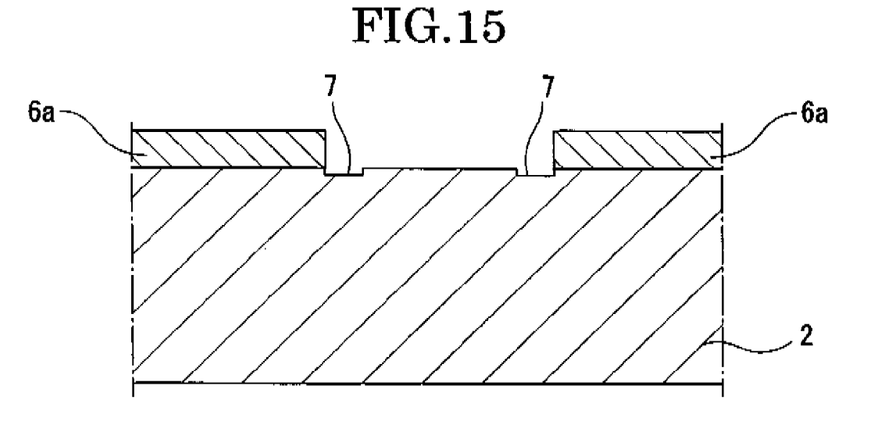
FIG. 15 is an enlarged partial end view showing the manufacturing process 1 according to the third embodiment of the present invention.

The manufacturing process 1 is shown in FIGS. 14 and 15. In FIG. 14, the surface of the base 2 is masked with a first masking material 6a, and the linear notch 7 is formed in the first masking material 6a along the boundary a that forms the contour of a desired geometrical structure or character or the like, by cutting by the laser processing such that the linear notch 7 reaches from the top of the first masking material 6a at least a little into the base 2. Thereby, the first masking material 6a is completely cut, and thus an area that should remain is not affected on the occasion of next removal of the first masking material 6a. The first masking material 6a is removed in either one of the areas sectioned by the linear notch 7, in particular, within the area bordered with the linear notch 7 as employed herein, so that the surface of the base 2 emerges as shown for example in FIG. 15.

(Manufacturing Process 2)

Figure 16:
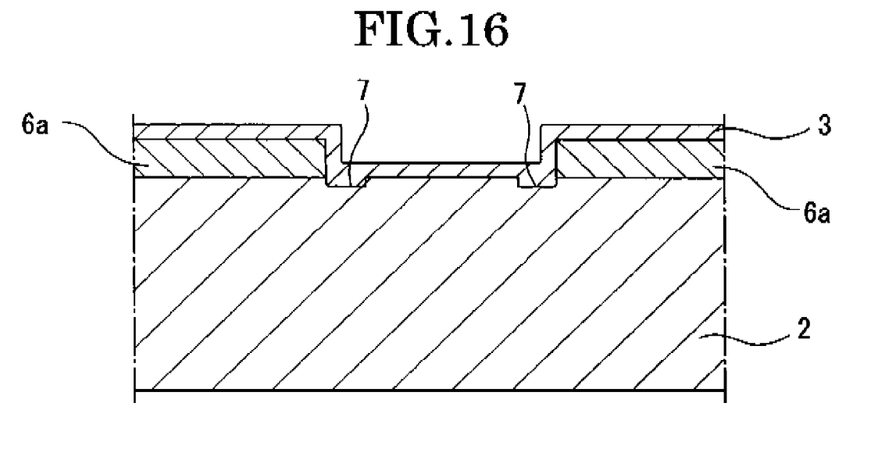
FIG. 16 is an enlarged partial end view showing a manufacturing process 2 according to the third embodiment of the present invention.
Figure 17:
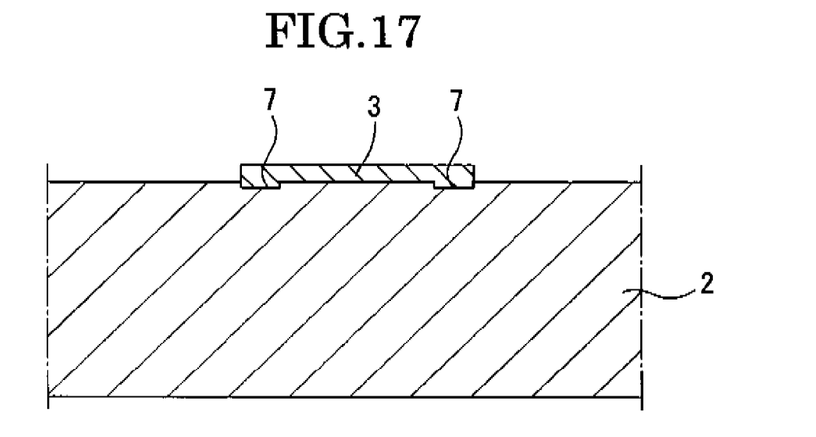
FIG. 17 is an enlarged partial end view showing the manufacturing process 2 according to the third embodiment of the present invention.

The manufacturing process 2 is shown in FIGS. 16 and 17. As shown in FIG. 16, the first decoration face 3 is formed throughout the entire surface on the surface of the base 2 (including the linear notch 7) emerging through the removal of the first masking material 6a and the remaining first masking material 6a. Then, the first masking material 6a is removed and hence the first decoration face 3 on the first masking material 6a is also necessarily removed, so that the first decoration face 3 remains in one area and the surface of the base 2 emerges in the other area, as shown in FIG. 17.

(Manufacturing Process 3)

Figure 18:
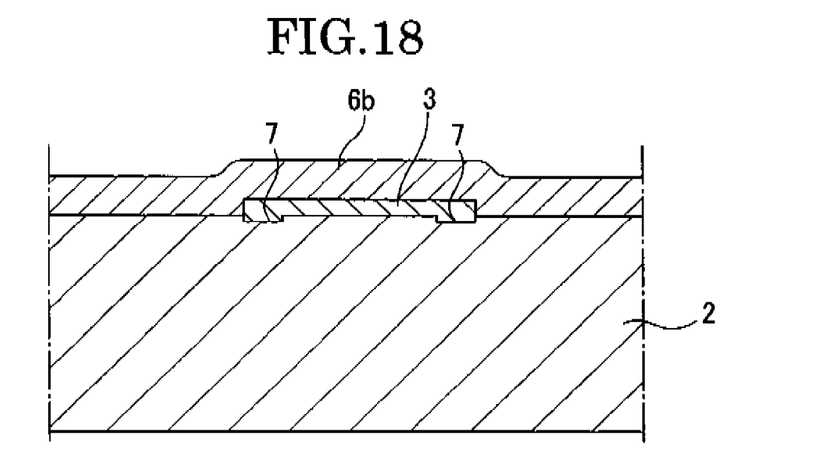
FIG. 18 is an enlarged partial end view showing a manufacturing process 3 according to the third embodiment of the present invention.
Figure 19:
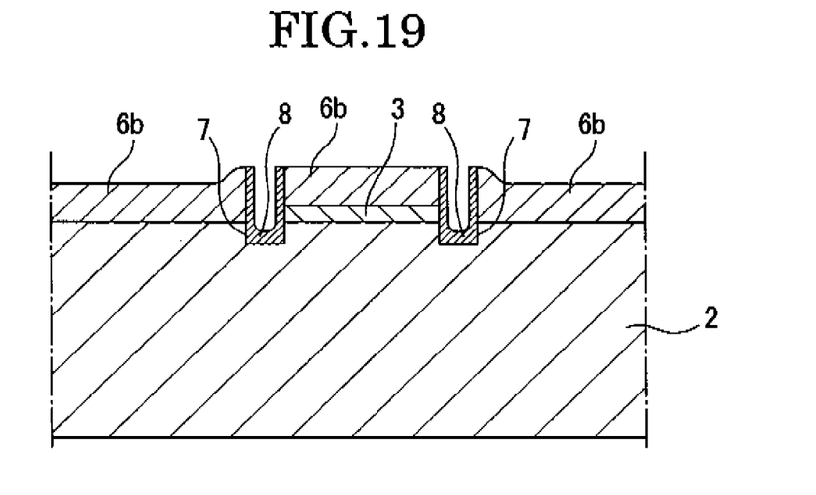
FIG. 19 is an enlarged partial end view showing the manufacturing process 3 according to the third embodiment of the present invention.

The manufacturing process 3 is shown in FIGS. 18 and 19. The remaining first decoration face 3 and the surface of the base 2 are masked throughout the entire area with a second masking material 6b as shown in FIG. 18. Then, the linear notch 7 is formed by the laser processing in the second masking material 6b and the first decoration face 3 along the linear notch 7 already formed shallowly in the base 2, so that the linear notch 7 reaches from the top of the second masking material 6b deeply into the base 2. The coating layer 8 is formed in the formed linear notch 7.

(Manufacturing Process 4)

Figure 20:
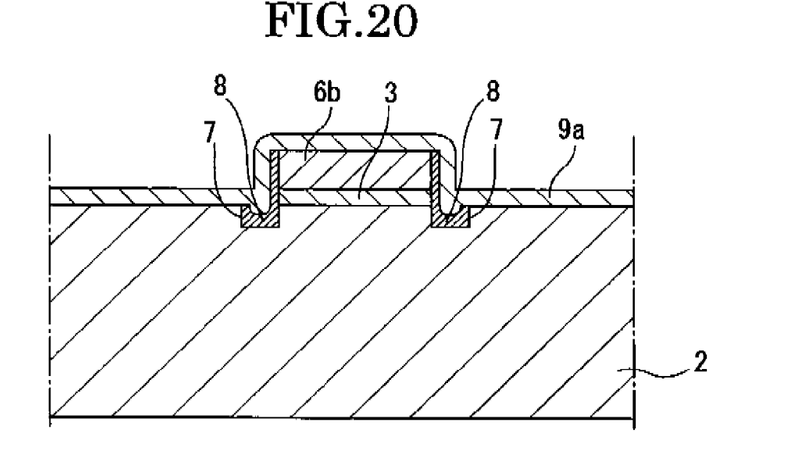
FIG. 20 is an enlarged partial end view showing a manufacturing process 4 according to the third embodiment of the present invention.
Figure 21:
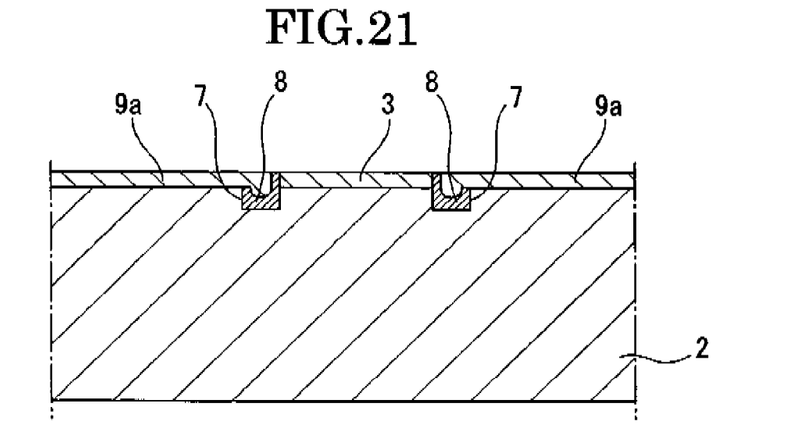
FIG. 21 is an enlarged partial end view showing the manufacturing process 4 according to the third embodiment of the present invention.

The manufacturing process 4 is shown in FIGS. 20 and 21. A transition occurs from a state shown in FIG. 19 to a state shown in FIG. 20. Specifically, while the first decoration face 3 and the second masking material 6b on the first decoration face 3 are left, the rest of the second masking material 6b is removed. Consequently, the surface of the base 2 emerges, and then the second decoration face 9a is formed throughout the entire surface on the first decoration face 3, the linear notch 7 and the emerging surface of the base 2. Then, the projecting second masking material 6b is removed, and eventually the second decoration face 9a on the second masking material 6b is also removed. Thereby, as shown in FIG. 21, the first decoration face 3 and the second decoration face 9a are formed flush with each other, and the coating layer 8 of the linear notch 7 emerges in a part to thereby section the first decoration face 3 and the second decoration face 9a.

(Manufacturing Process 5)

The manufacturing process 5 is shown in FIG. 22. The color coat 10 and the top coat 11 for preventing discoloring, which are transparent or translucent so that the first decoration face 3 and the second decoration face 9a can be seen therethrough, are formed in sequence on and above the first decoration face 3 and the second decoration face 9a formed flush with each other. Thereby, the linear notch 7 looks as if it were the real inlay in abutting relation between the first decoration face 3 and the second decoration face 9a, resulting in the completion of the interior panel 1c that is the false inlay decoration.

A manufacturing method according to the third embodiment is more appropriate for plating or the like such as the one involving dipping the overall base 2. Although in the above embodiments the false inlay decoration is applied to the automotive interior panel, the false inlay decoration is not limited to this but may be widely applied to what is intended for decoration.

INDUSTRIAL APPLICABILITY

The false inlay decoration and the method for producing the same according to the present invention are applicable over a wide range of fields, such as interior equipment and an emblem for a vehicle such as an automobile, furniture such as a screen, a desk, a chair and a display shelf, an industrial art object such as a tray, a tea set and a flower vase, and accessories such as a brooch, a comb and a ring.

The invention claimed is:

1. A method of producing a false inlay decoration, comprising:
    masking a surface of a base with a first masking material;
    forming a linear notch in the first masking material along a desired boundary by laser processing, the linear notch reaching from the first masking material into the base;
    removing the first masking material in either one of areas sectioned by the linear notch;
    forming a first decoration layer on the surface of the base having the first masking material removed therefrom and the remaining first masking material;
    removing the first masking material as well as the first decoration layer on the first masking material;
    masking the remaining first decoration layer and the surface of the base with a second masking material;
    forming again a linear notch in the second masking material and the first decoration layer along the position of the linear notch by laser processing, the linear notch reaching into the base;
    forming a coating layer in the linear notch;
    removing the rest of the second masking material while leaving the first decoration layer and the second masking material on the first decoration layer, so that the surface of the base emerges;
    forming a second decoration layer on the first decoration layer, the linear notch and the emerging surface of the base; and
    removing the second masking material and the second decoration layer on the second masking material, thereby forming the first decoration layer and the second decoration layer flush with each other.

2. The method of producing a false inlay decoration according to claim 1, wherein the first decoration layer and the second decoration layer are each formed of one of a hydraulic transfer film and a metal coating film.

3. The method of producing a false inlay decoration according to claim 2, wherein the metal coating film is formed by any one of plating, sputtering, metal deposition, silver mirror reaction coating, and ion plasma evaporation.

* * * * *